United States Patent [19]
Haga et al.

[11] Patent Number: 5,305,858
[45] Date of Patent: Apr. 26, 1994

[54] ROTARY SHOCK ABSORBER HAVING VANES WITH RADIAL FLOW CLEARANCE

[75] Inventors: Kyosuke Haga, Anjo; Toshifumi Sakai, Aichi; Naoyuki Kokubo, Aichi; Masaharu Ooba; Youzo Yamaguchi, Nagoya; Sadamu Tuge, Toyota, all of Japan

[73] Assignee: Toyoda Koki Kabushiki Kaisha, Kariya, Japan

[21] Appl. No.: 918,221

[22] Filed: Jul. 21, 1992

[30] Foreign Application Priority Data

| Jul. 22, 1991 | [JP] | Japan | 3-204619 |
| Jul. 22, 1991 | [JP] | Japan | 3-204620 |
| Jul. 25, 1991 | [JP] | Japan | 3-207314 |
| Jul. 25, 1991 | [JP] | Japan | 3-207315 |
| Jul. 25, 1991 | [JP] | Japan | 3-207316 |

[51] Int. Cl.$^5$ ............................................. F16F 9/12
[52] U.S. Cl. ................................ 188/271; 92/57; 188/296; 188/307
[58] Field of Search .............. 188/271, 296, 307, 308, 188/309; 92/57

[56] References Cited

U.S. PATENT DOCUMENTS

| 4,905,808 | 3/1990 | Tomita et al. | 192/85 AA |
| 4,942,947 | 7/1990 | Shtarkman | |
| 4,966,268 | 10/1990 | Asano et al. | 192/85 AA X |
| 5,012,908 | 5/1991 | Koboyoshi et al. | 192/57 |

FOREIGN PATENT DOCUMENTS

| 0234157 | 9/1987 | European Pat. Off. | |
| 0250913 | 1/1988 | European Pat. Off. | |
| 61-162631 | 10/1986 | Japan | |
| 1-80840 | 5/1989 | Japan | |
| 1-80841 | 5/1989 | Japan | |
| 66329 | 3/1990 | Japan | 192/57 |
| 579474 | 11/1977 | U.S.S.R. | 199/271 |
| 471117 | 8/1937 | United Kingdom | 188/271 |

*Primary Examiner*—Matthew C. Graham
*Attorney, Agent, or Firm*—Oblon, Spivak, McClelland, Maier & Neustadt

[57] ABSTRACT

A rotary shock absorber suitable for use in a suspension system of a vehicle. The shock absorber is provided with a housing and a rotary shaft supported by the housing for relative rotation thereto. A pressure chamber is formed in the housing and a rotor having a pair of blades is received within the pressure chamber. Further, a pair of partition walls are formed within the pressure chamber to define first and second chambers at both sides of each blade, and the first and second chambers are communicated with each other through throttles. When the rotary shaft is rotated, a high viscous fluid filled within the first and second chambers flows therebetween through the throttles. Due to the flow resistances of the throttles, pressures are generated in the first or second chambers. This pressure generation is used to generate a damping force. The shock absorber is further provided with a mechanism which changes the characteristic of damping force generation depending on the rotational direction of the rotary shaft. In some embodiments, the shock absorber has a stopper function which drastically increases the damping force at the stroke ends.

4 Claims, 8 Drawing Sheets

ROTARY SHOCK ABSORBER HAVING VANES WITH RADIAL FLOW CLEARANCE

BACKGROUND OF THE INVENTION

1. Field of the Invention

The present invention relates to a rotary shock absorber and, more particularly, to a rotary shock absorber suitable for use in a suspension system of a vehicle.

2. Discussion of the Prior Art

Figure 1:
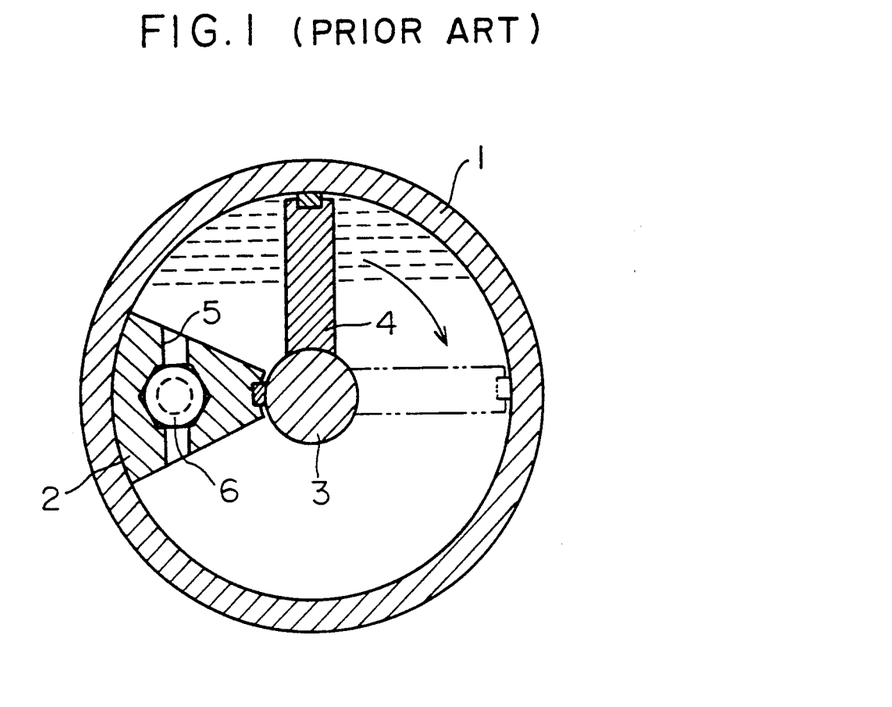
FIG. 1 is a sectional view illustrating a conventional rotary shock absorber.

An example of a rotary shock absorber for absorbing rotational force is disclosed in Japanese Utility Model Laid-Open No. 60-3336. As illustrated in FIG. 1, the rotary shock absorber is mainly composed of a cylindrical housing 1, a partition wall member 2 inwardly protruding in a radial direction from the inner surface of the housing 1, a rotary shaft 3 penetrating the housing 1, and a vane 4 fixed to the rotary shaft 3 for rotation herewith and extending in a radial direction so that the inner chamber of the housing 1 is divided into two chambers in which an operation fluid is filled. Further, the partition wall member 2 is formed with a communication pass 5, and an adjustable throttle valve 6 is disposed in the communication pass 5.

In the rotary shock absorber, the vane 4 is rotated in response to a rotation of the rotary shaft 3. With this rotation of the vane 4, the operation fluid in one chamber whose volume decreases flows to the other chamber whose volume increases through the throttle valve 6, which acts as a resistance against the flow of the operation fluid, whereby a damping force is generated. The damping force is adjusted by the throttle valve 6.

In the conventional shock absorber, since the damping force is generated by the fluid resistance of the throttle valve through which the operation fluid flows, the conventional shock absorber can provide neither sufficient damping force nor sufficient response speed.

Figure 2:
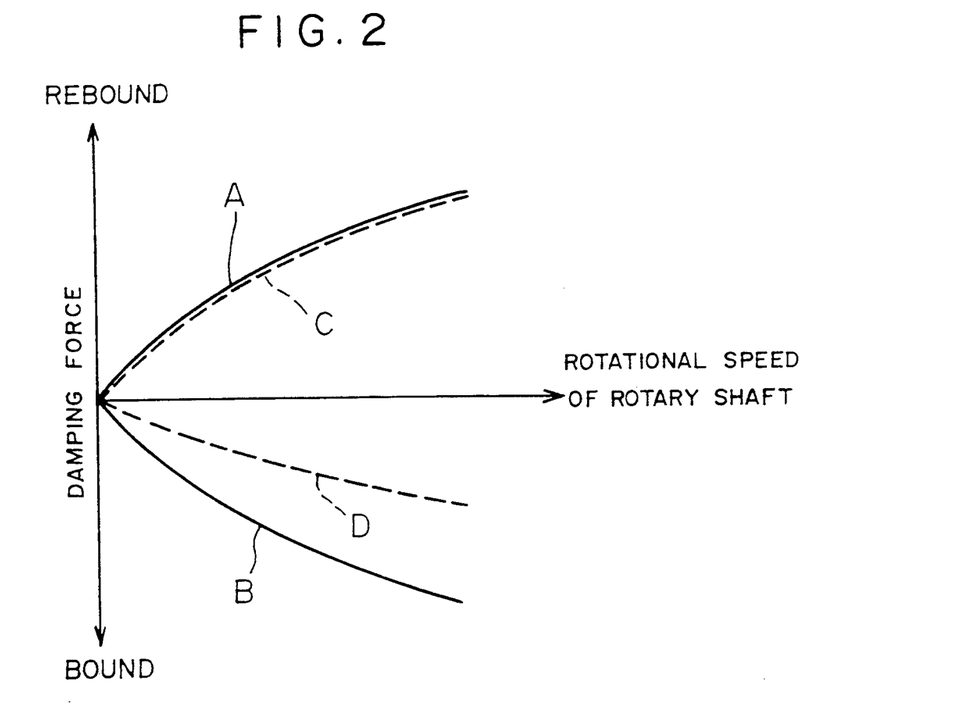
FIG. 2 is a graph showing the characteristic of the conventional rotary absorber and a desired characteristic.

Further, the damping force generated by the shock absorber increases in accordance with increase of the rotational speed of the rotary shaft 3, but has the same characteristic regardless of the rotational direction of the rotary shaft 3, as illustrated by solid lines A and B in FIG. 2. Therefore, the conventional rotary shock absorber is not suitable for use in a suspension system of a vehicle. Namely, a rotary shock absorber used in the suspension system is required to change its characteristic depending upon the rotational direction of the rotary shaft 3, as illustrated by broken lines C and D in FIG. 2. When the rotational shaft 3 rotates in a forward direction (rebound direction), it must generate a large damping force, as illustrated by the broken line C. On the contrary, when the rotational shaft 3 rotates in a reverse direction (bound direction), it must generate a relatively small damping force, as illustrated by the broken line D.

Further, in a conventional suspension system, dampers made of rubber are used as stoppers for limiting the bound and rebound movements of tires, and for absorbing shocks which are produced at the stroke ends. Although the shocks are almost absorbed by the dampers, it is desirable to reduce the shocks more to provide a comfortable ride.

SUMMARY OF THE INVENTION

Accordingly, it is an object of the present invention to provide an improved rotary shock absorber capable of quickly generating a large damping force.

It is another object of the present invention to provide an improved rotary shock absorber capable of changing its characteristic depending upon the rotational direction of a rotary shaft thereof.

It is still another object of the present invention to provide an improved rotary shock absorber capable of drastically increasing its damping force when the rotary shaft approaches the stroke ends thereof.

Briefly, the improved rotary shock absorber according to the present invention comprises a cylindrical housing, a rotary shaft carried by the cylindrical housing for rotation relative thereto, a brake disposed between the housing and rotary shaft to generate a damping force by frictional engagement of the brake, a piston received within the housing for axial movement to actuate the brake in response to a pressure applied to the piston, and a pressure generating mechanism for applying the pressure to the piston.

The pressure generating mechanism comprises a pressure chamber formed at an axial location adjacent to the piston and filled with an operation fluid, a rotor mechanically coupled with the rotary shaft for rotation therewith and received within the pressure chamber, the rotor having at least one blade extending in a radial direction, and at least one partition wall means formed within the pressure chamber so that the pressure chamber is divided into first and second chambers in a circumferential direction by the partition wall means and the blade, whereby a pressure is generated in one of the first and second chambers when the rotary shaft is rotated relative to said housing.

Since the damping force is generated by the brake, which generates a large friction force by the engagement of multiple plates, a large damping force is quickly generated.

In preferred embodiments, the rotary shock absorber is further characterized in that a first pressure receiving area through which a pressure generated in the first chamber is transmitted to the piston is different from a second pressure receiving area through which a pressure generated in the second chamber is transmitted to the piston.

With this configuration, the rotary shock absorber according to the present invention has an advantage that its characteristic of damping force generation changes depending upon the rotational direction of the rotary shaft. The rotary shock absorber is therefore particularly suitable for use in a suspension system.

In a preferred embodiment, the rotary shock absorber also has a stopper function which provides a more comfortable ride.

A rotary shock absorber of another type according to the present invention comprises, a cylindrical housing which has a cylindrical inner surface for defining a pressure chamber which is filled with an operation fluid, a rotary shaft carried by the cylindrical housing for rotation relative thereto, a rotor mechanically coupled with the rotary shaft for rotation therewith and received within the pressure chamber, the rotor having at least one blade, and at least one partition wall means formed within the pressure chamber so that the pressure chamber is divided into first and second chambers in a circumferential direction by the partition wall means and said blade, whereby a pressure is generated in one of said first and second chambers when the rotary shaft is rotated relative to said housing. The rotary shock absorber further comprises a mechanism for changing the characteristic of pressure generation depending upon the rotational direction of the rotary shaft.

The rotary shock absorber according to this configuration also has an advantage that its characteristic of damping force generation changes depending upon the rotational direction of the rotary shaft.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 3:
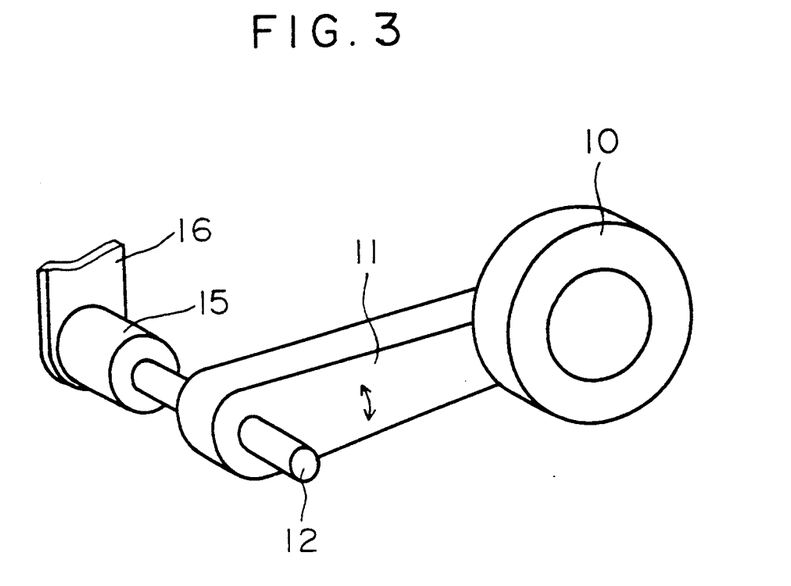
FIG. 3 is a schismatical chart illustrating a suspension system of a vehicle in which a rotary shock absorber is used.

FIG. 3 shows a suspension system of a vehicle, in which a road wheel 10 is rotatably carried by a suspension arm 11, the base end of which is fixed to a suspension shaft 12. The suspension shaft 12 is rotatably supported by a frame of the vehicle through brackets (not shown), and is coupled with a rotary shock absorber 15 which is also supported by the frame through a bracket 16. Embodiments of the rotary shock absorber 15 will now be explained.

First Embodiment

A first embodiment will be explained with reference to FIGS. 4 and 5.

Figure 4:
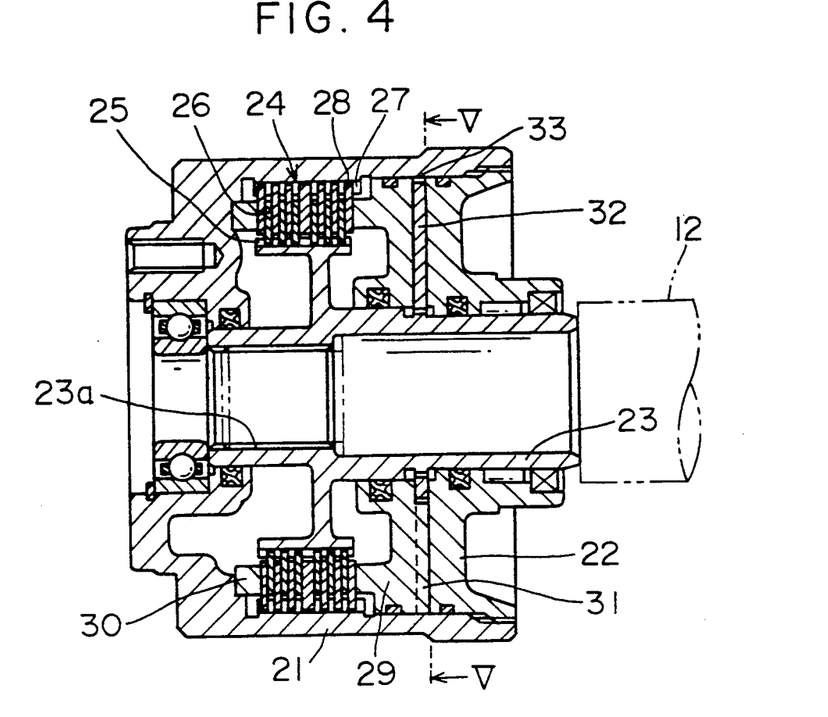
FIG. 4 is a sectional view of a rotary shock absorber according to a first embodiment of the present invention.

Referring FIG. 4, reference numeral 21 denotes a cylindrical housing having an opening at its one end to which a end cap 22 is attached in a fluid tight manner. A hollow rotary shaft 23 is supported by the housing 21 in a coaxial relationship with the housing 21 for rotation relative to the housing 21. The rotary shaft 23 has a splined portion 23a on its inner surface for spline engagement with the suspension shaft 12.

A friction brake 24 is disposed in a space between the housing 21 and rotary shaft 23 for generation of damping force. The friction brake 24 comprises plural inner plates 26 which are engaged with a hub portion of the rotary shaft 23 through a spline 25 for rotation therewith and for axial movement with respect to the rotary shaft 23, and plural outer plates 28 which are engaged with the inner surface of the housing 21 through a spline 27 for mechanical connection therewith in the rotational direction of the rotary shaft 23 and for axial movement with respect to the housing 21. These inner plates 26 and outer plates 28 are arranged in alternative fashion to contact with each other, thereby constituting a so-called multiple-disc brake. In the space receiving the brake 24 is filled with an oil for lubrication and cooling of the brake 24.

Disposed between the brake 24 and end cap 22 is a piston 29 for applying a thrust force to the brake 24. The inner cylindrical surface of the piston 29 is contacted with the outer surface of the rotary shaft 23 in a fluid tight manner with axial movement relative to the rotary shaft 23 being allowed, while the outer surface of the piston 29 is engaged with the housing 21 through a spline (not shown) for mechanical connection therewith in the rotational direction of the rotary shaft 23 and for axial movement relative to the housing 21. Disposed between a bottom end surface of the housing 21 and the brake 24 is a ring member 30, which is fixed to the housing 21 and against which the brake 24 abuts.

A pressure chamber 33 having a small axial width is formed between the back end surface of the piston 29 and the end cap 22, and a rotor 32 spline-engaged with the rotary shaft 23 is received within said pressure chamber 33 for rotation with the rotary shaft 23. The rotor 32 is formed with a pair of blades 32A extending in a diametric direction (Y-axis direction), as shown in FIG. 5.

Further, part of the back end surface of the piston 29 is protruded toward the pressure chamber 33 to form a pair of partition walls 31 so that a first and second chambers S1 and S2 are formed at both sides of each blade 32A. The partition walls 31 may be formed on the inner surface of the end cap 22. The pressure chamber 33 is filled with a high viscous operation fluid such as silicone oil. A small amount of air may be mixed in the viscous fluid.

Figure 5:
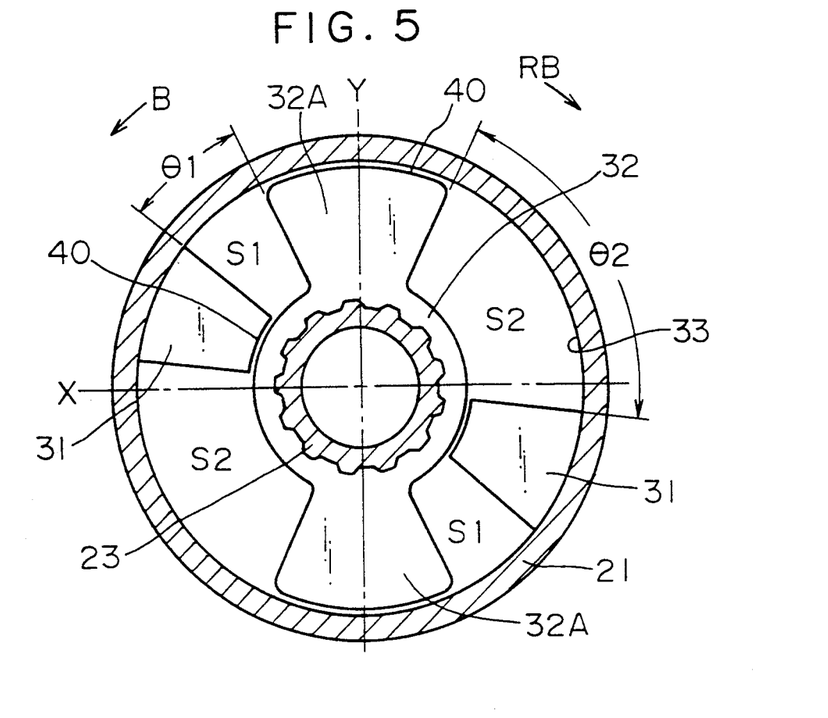
FIG. 5 is a sectional view taken along line V—V in FIG. 4.

The partition walls 31 are formed at locations shifted in the clockwise direction (rebound direction), as viewed in FIG. 5, from a diametrical direction corresponding to the X-axis direction perpendicular to the Y-axis direction, by a predetermined angle. With this configuration, the angular width $\theta 2$ of the second chambers S2 becomes larger than the angular width $\theta 1$ of the first chambers S1, whereby a pressure receiving area of the piston 29 in the second chambers S2 becomes larger than that in the first chambers S1.

In this embodiment, a pair of partition walls 31 are provided at opposite sides of the rotational axis of the rotary shaft 23 and the rotor 32 has two blades 32A. However, one of the partition walls 31 and one of the blades 32A may be omitted.

An operation of the rotary shock absorber having the above-mentioned constitution will now be explained.

When the rotary shaft 23 is rotated from its neutral position, the rotor 32 is rotated from its neutral position as shown in FIG. 5, in response to the rotation of the rotary shaft 23. During this operation, the high viscous fluid in one of the first and second chambers whose volumes decrease flows to the other chambers through clearances 40 between the outer edges of the blades 32A and the inner surface of the housing 21. The clearances 40 are small enough to act as throttles. As a result, pressures are generated in the first chambers S1 or second chambers S2 due to the flow resistances of the clearances, thereby a thrust force is given to the piston 29. The piston 29 is thus moved toward the brake 24, whereby a frictional force is produced between the inner plates 26 and outer plates 28 of the brake 24. This frictional force acts as a damping force against the relative rotation of the rotary shaft 23.

Since the neutral positions of the rotor 32 is determined so that the initial angular width of the second chambers S2 is larger than that of the first chambers S1, namely the pressure receiving area of the piston 29 exposed to the second chambers S2 is larger than that in the first chambers S1, a larger thrust force acts on the piston 29 when the rotary shaft 23 is rotated in the clockwise direction (rebound direction) as compared to that when the rotary shaft 23 is rotated in the counter clockwise direction (bound direction), whereby a desired characteristic can be obtained. Namely, as illustrated by the broken lines C and D in FIG. 2, a larger damping force is generated when the rotary shaft 23 is rotated in the clockwise direction (rebound direction) as compared to that when the rotary shaft 23 is rotated in the counter clockwise direction (bound direction).

Although the above-described rotary shock absorber has the characteristic that the damping force changes depend on the rotational direction of the rotary shaft 23, the rotary shock absorber may be modified such that the same damping characteristic is obtained regardless of the rotational direction of the rotary shaft 23. To obtain such characteristic, the pair of partition walls 31 are arranged at locations coincide with the X-axis direction so that the initial pressure receiving area of the piston 29 exposed to the first chambers S1 becomes the same as that exposed to the second chambers S2.

Second Embodiment

Figure 6:
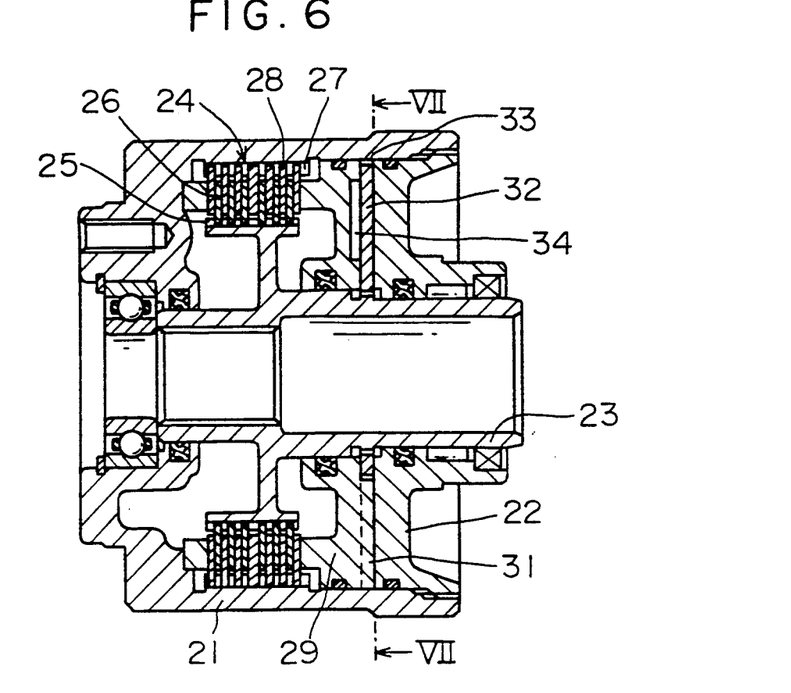
FIG. 6 is a sectional view of a rotary shock absorber according to a second embodiment of the present invention.
Figure 7:
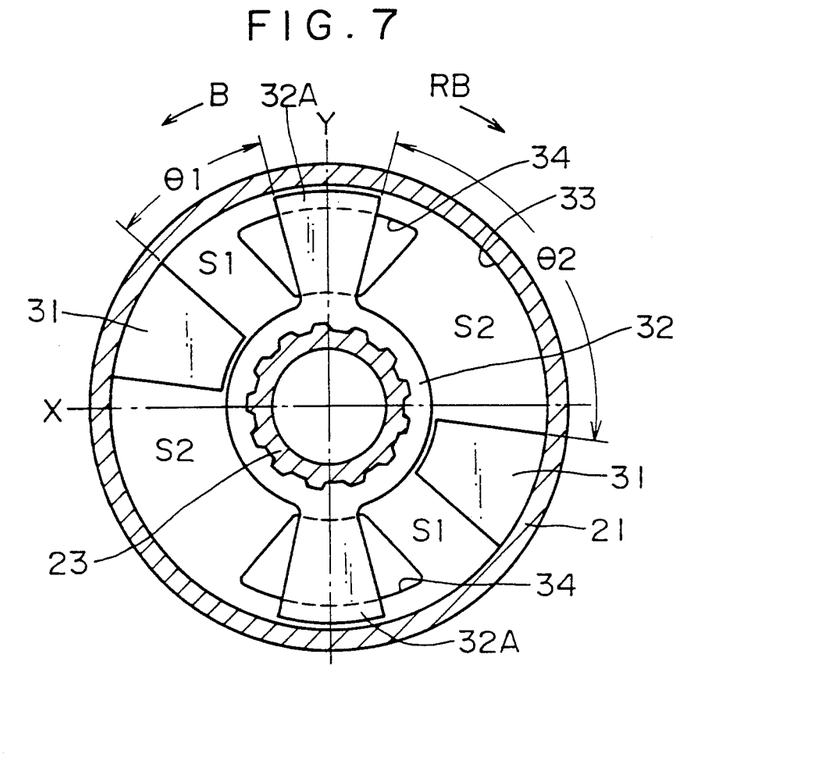
FIG. 7 is a sectional view taken along line VII—VII in FIG. 6.

FIGS. 6 to 7 show a second embodiment of the present invention, wherein the rotary shock absorber as described above is improved to have a stopper function as well as the damping function.

Namely, a pair of concave portions 34 form the clearances and are formed on the back end surface of the piston 29 at locations corresponding to the Y-axis direction. The width of the concave portions 34 in a circumferential direction is wider than that of the blades 32A by a predetermined amount. With this constitution, throttle passages are formed by the blades 32A and the concave portions 34. The concave portions 34 may be formed on the inner end surface of the end cap 22.

An operation of the rotary shock absorber having the above-mentioned constitution will now be explained.

When the rotary shaft 23 is rotated from its neutral position, the rotor 32 is rotated from its neutral position as shown in FIG. 7. During this operation, the high viscous fluid in one of the first and second chambers whose volumes decrease flows to the other chambers through the throttles formed by the concave portions 34 and the blades 32A. As a result, pressures are generated in the first chambers S1 or second chambers S2 due to the flow resistances of the throttles, thereby a thrust force is given to the piston 29. The piston 29 is thus moved toward the brake 24, whereby a frictional force acting as damping force is produced in the brake 24.

Since the neutral position of the rotor 32 is determined so that the initial angular width of the second chambers S2 is larger than that of the first chambers S1, namely the pressure receiving area in the second chambers S2 is larger than that in the first chambers S1, a higher pressure is generated when the rotary shaft 23 is rotated in the clockwise direction (rebound direction) as compared to that when the rotary shaft 23 is rotated in the counter clockwise direction (bound direction), whereby a desired characteristic can be obtained.

Figure 8:
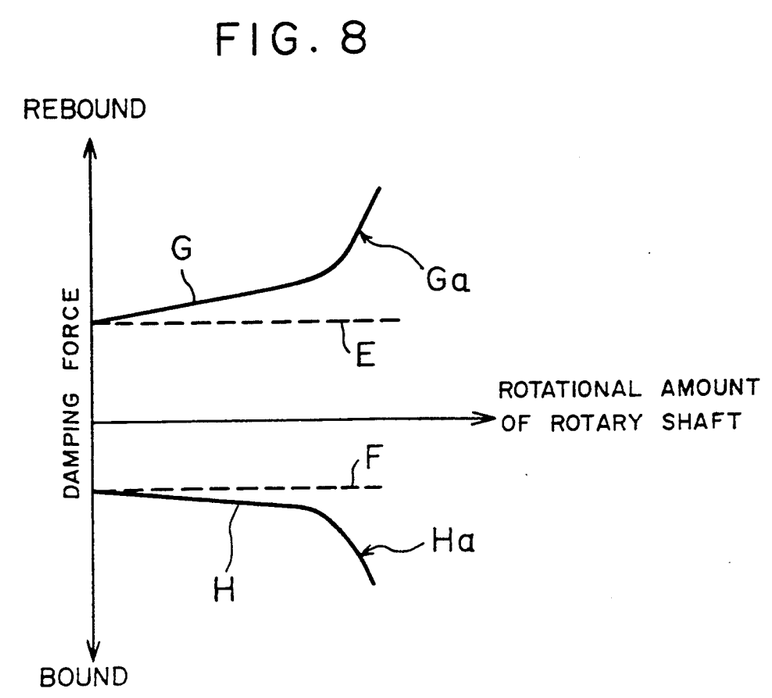
FIG. 8 is a graph showing changes in the generated damping force with respect to changes in the rotational amount of the rotary shaft.

Further, the rotary shock absorber has solved a problem in the conventional rotary absorber. Namely, in the conventional rotary absorber, the damping force does not change regardless of the angular position of the rotary shaft 23, as illustrated by broken lines E and F in FIG. 8, when the rotary shaft 23 is rotated at a constant speed. In the rotary shock absorber according to this embodiment, on the contrary, the damping force moderately increases, as illustrated by solid lines G and H in FIG. 8, when the rotary shaft 23 is not close to its stroke ends, but the damping force drastically increases when the rotary shaft 23 approaches the stroke ends, as indicated by arrows Ga and Ha in FIG. 8. This characteristic is realized by the concave portions 34 as follows.

Namely, when the blades 32A are located at their neutral positions corresponding to Y-axis direction, opening areas of the concave portions 34 opening to the first and second chambers S1 and S2 are the largest. In this state, the flow resistance becomes relatively small. However, when the rotary shaft 23 rotates in clockwise or counter clockwise direction, the opening areas of the concave portions 34 gradually becomes smaller. Further, when the rotary shaft 23 reaches one of the stroke ends, the opening areas become zero so that little viscous fluid flows between the first and second chambers S1 and S2 through the concave portions 34, whereby the damping force drastically increases, as indicated by the arrows Ga and Ha in FIG. 8. This characteristic is called as "hump characteristic", and this hump characteristic of the rotary shock absorber realizes the stopper function.

The suspension system is designed such a way that the suspension arm is contact with stoppers after the stopper function of the rotary shock absorber has been effected. This decreases shocks which are produced due to the contact of the suspension arm with the stoppers, thereby providing a more comfortable ride.

Third Embodiment

Figure 9:
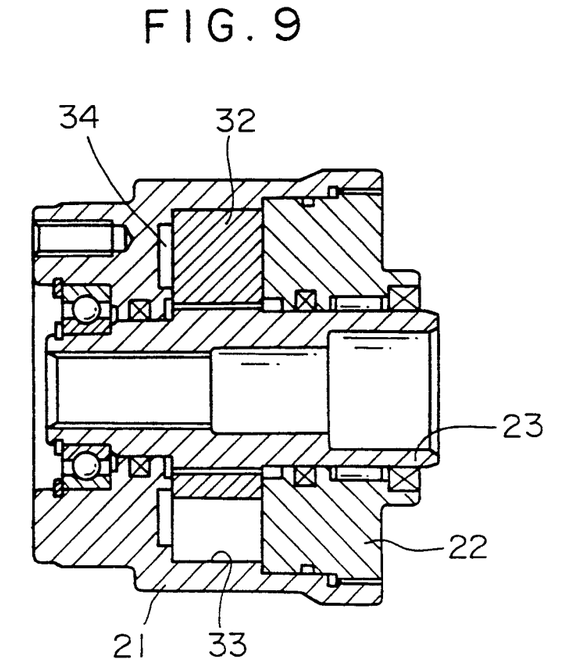
FIG. 9 is a sectional view of a rotary shock absorber according to a third embodiment of the present invention.

A third embodiment will be described with reference to FIG. 9. Although the piston 29 and the brake 24 are used for damping force generation in the first and second embodiments, the rotary shock absorber according to the third embodiment use neither the piston 29 nor brake 24. As shown in FIG. 9, a rotor 32 having a large axial width is spline-engaged with the rotary shaft 23, and the rotor 32 has the same cross section as that of the rotor 32 in the second embodiment. Further, a pair of partition walls 31 are protruded from the inner surface of the housing 21, and the pair of concave portions 34 are formed on the bottom end surface of the housing 21. In this embodiment, a damping force is generated due to a flow resistance of a viscous fluid filled within the space 33, which flow resistance occurs when the viscous fluid flows through the concave portions 34. The partition walls 31 and concave portions 34 may be formed on the inner end surface of the end cap 22. The rotary shock absorber according to the second embodiment has a damping characteristic and a hump characteristic similar to those of the second embodiment.

Forth Embodiment

Figure 10:
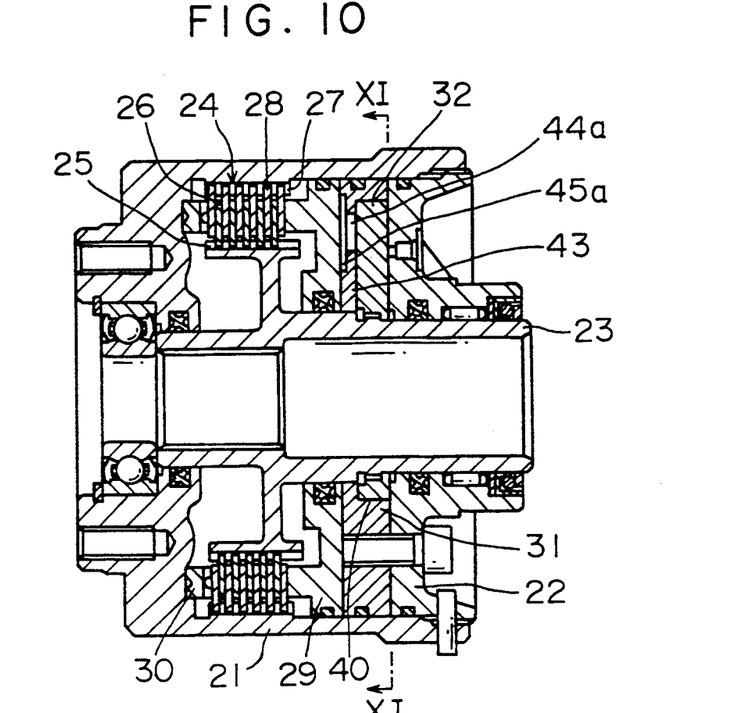
FIG. 10 is a sectional view of a rotary shock absorber according to a fourth embodiment of the present invention.

A forth embodiment will be described with reference to FIGS. 10 and 11.

A rotary shock absorber according to the forth embodiment is provided with a circular intermediate member 43 which is disposed between the piston 29 and the end cap 22, and fixed to the end cap by means of bolts. The intermediate member 43 is formed with a depressed portion for defining the pressure chamber 33 within which the rotor 32 is received, and a pair of partition walls 31. The partition walls 31 may be protruded from the inner end surface of the end cap 22. The first chambers S1 and second chambers S2 are communicated with each other through clearances 40 between the rotor 32 and the inner surface of the intermediate member 43. The clearances 40 act as throttles.

Further, the intermediate member 43 is formed with a pair of connection holes 44a and 44b which penetrate the intermediate member 43 in a direction of thickness thereof. One ends of the connection holes 44a and 44b are communicated with the first and second chambers S1 and S2, respectively, while the other ends thereof are communicated with first and second openings 45a and 45b, respectively. The cross section of the second opening 45b is smaller than that of the first opening 45a. The first and second chambers S1 and S2 are filled with a high viscous fluid such as a silicone oil.

An operation of the rotary shock absorber having the above-mentioned constitution will now explained.

Figure 11:
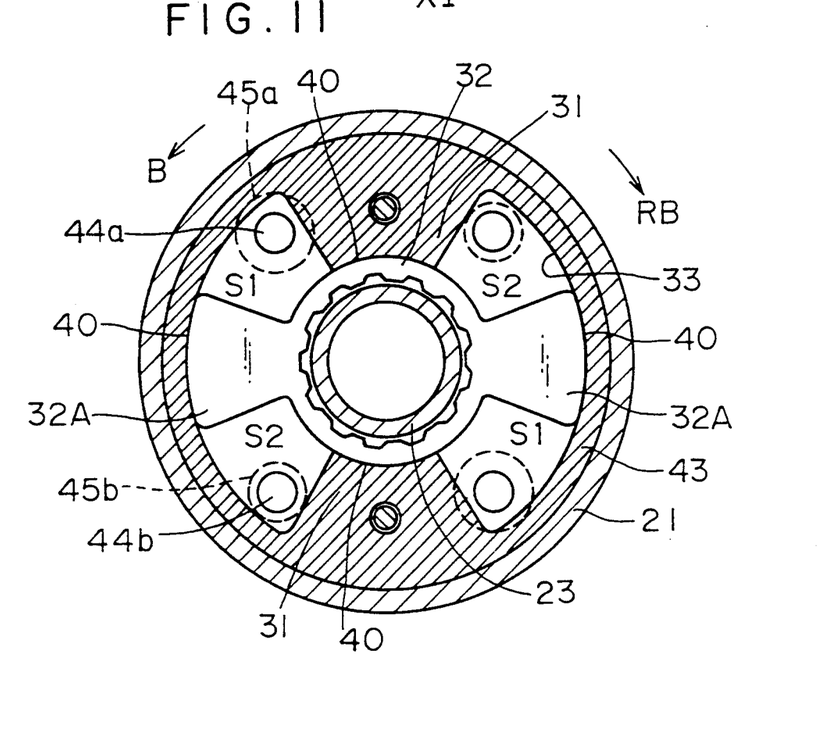
FIG. 11 is a sectional view taken along line XI—XI in FIG. 10.

When the rotary shaft 23 is positioned at its neutral position, the blades 32 are also located at their neutral positions as shown in FIG. 11. In such condition, the width in the circumferential direction of the chambers S1 is the same as that of the chambers S2. When the rotor shaft 23 is rotated from its neutral position, the rotor 32 or blades 32A rotate in response to the rotation of the rotary shaft 23. During this operation, the high viscous fluid in ones of the first and second chambers whose volumes decrease flows to the other chambers through the clearances 40. As a result, pressures are generated in the chambers S1 or S2.

Namely, when the rotor 32 is rotated in the clockwise direction (rebound direction) as viewed in FIG. 11, the volumes of the first chambers S1 decreases while the volumes of the second chambers S2 increase, whereby the viscous fluid flows from the first chambers S1 to the second chambers S2. During such operation, pressures are generated in the first chambers S1 due to the flow resistances of the clearances 40, and the generated pressure is transmitted to the piston 29 through the connection holes 44a and openings 45a.

Since the diameter of the openings 45a is relatively large, the relatively large thrust force acts on the piston 29, whereby the inner plates 26 and outer plates 28 are engaged with each other to generate a friction force in proportion to the generated pressures. As a result, a relatively large damping force is generated in proportion to the rotational speed of the rotary shaft 23, as illustrated by the broken lines C in FIG. 2.

On the contrary, when the rotor 32 is rotated in the counter clockwise direction (bound direction) as viewed in FIG. 11, the volumes of the second chambers S2 decreases while the volumes of the first chambers S1 increase, whereby the viscous fluid flow from the second chambers S1 to the first chambers S2. During such operation, pressures are generated in the second chambers S2 due to the flow resistances of the clearances 40, and the generated pressure is transmitted to the piston 29 through the connection holes 44b and openings 45b.

Since the diameter of the openings 45b is smaller than the opening 45a, a relatively small thrust force acts on the piston 29, whereby the inner plates 26 and outer plates 28 are engaged with each other to generate a relatively small friction force.

As a result, a relatively small damping force is generated in proportion to the rotational speed of the rotary shaft 23, as illustrated by the broken lines D in FIG. 2.

Fifth Embodiment

Figure 12:
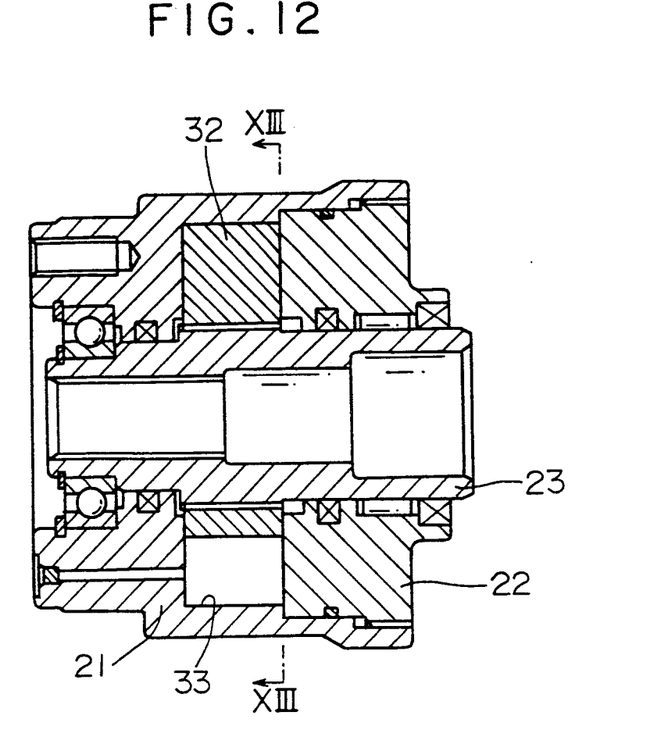
FIG. 12 is a sectional view of a rotary shock absorber according to a fifth embodiment of the present invention.

A fifth embodiment will be described with reference to FIGS. 12 and 13.

The housing 21 is provided with the pair of partition walls 31 which protrudes from the inner surface of the housing 21 at opposite sides. The rotor 32 is spline-engaged with the rotary shaft 23 and has the pair of blades 32A which divide the space 33 into the first and second chambers S1 and S2.

The rotor 32 has large diameter portions 56a and small diameter portions 56b to form steps at circumferential locations corresponding to partition walls 31. The diameter of the large diameter portions 56a is determined so that a relatively small clearance $\alpha$ is formed between the rotor 32 and the partition walls 31, while the diameter of the small diameter portions 56b is determined so that a relatively large clearance $\beta$ is formed between the rotor 32 and the partition walls 31. With this constitution, variable throttles 56 are formed at respective partition walls 31. The effective cross sections of the throttles 56 decrease when the rotor 23 rotate in the clockwise direction (rebound direction), while it increase when the rotor 23 rotate in the counter clockwise direction (bound direction).

When the rotary shaft 23 is rotated from its neutral position, the rotor 32 or blades 32A rotate in response to the rotation of the rotary shaft 23. During this operation, the high viscous fluid in ones of first and second chambers whose volumes decrease flows to the other chambers through the throttles 56. As a result, pressures are generated in the chambers S1 or S2.

Figure 13:
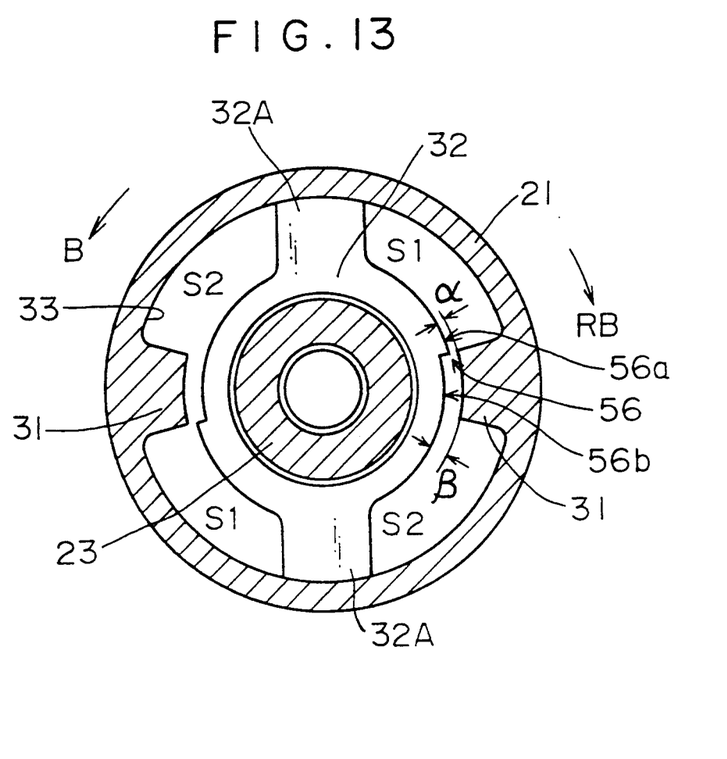
FIG. 13 is a sectional view taken along line XIII—XIII in FIG. 12.

Namely, when the rotor 32 is rotated in the clockwise direction (rebound direction) as viewed in FIG. 13, the volumes of the first chambers S1 decrease while the volumes of the second chambers S2 increase, whereby the viscous fluid flows from the first chambers S1 to the second chambers S2. During such operation, pressures are generated in the first chambers S1 due to the flow resistances of the throttles 56, and the generated pressures act directly on the piston 29. Since the flow resistances of the throttles 56 gradually increase, the pressures in the first chambers become higher gradually even when the rotary shaft 23 is rotated at a constant speed. Since the increase of the pressure acts as a damping force, a relatively large damping force is generated in proportion to the rotational speed of the rotary shaft 23, as illustrated by the broken lines C in FIG. 2.

On the contrary, when the rotor 32 is rotated in the counter clockwise direction (bound direction) as viewed in FIG. 13, the volumes of the second chambers S2 decrease while the volumes of the first chambers S1 increase, whereby the viscous fluid flows from the second chambers S1 to the first chambers S2. During such operation, pressures are generated in the second chambers S2 due to the flow resistances of the throttles 56, and the generated pressures act on the piston 29.

Since the flow resistances of the throttles 56 gradually decrease, the pressures in the second chambers become smaller gradually even when the rotary shaft 23 is rotated at a constant speed, whereby a relatively small damping force is generated in proportion to the rotational speed of the rotary shaft 23, as illustrated by the broken lines D in FIG. 2.

Sixth Embodiment

Figure 14:
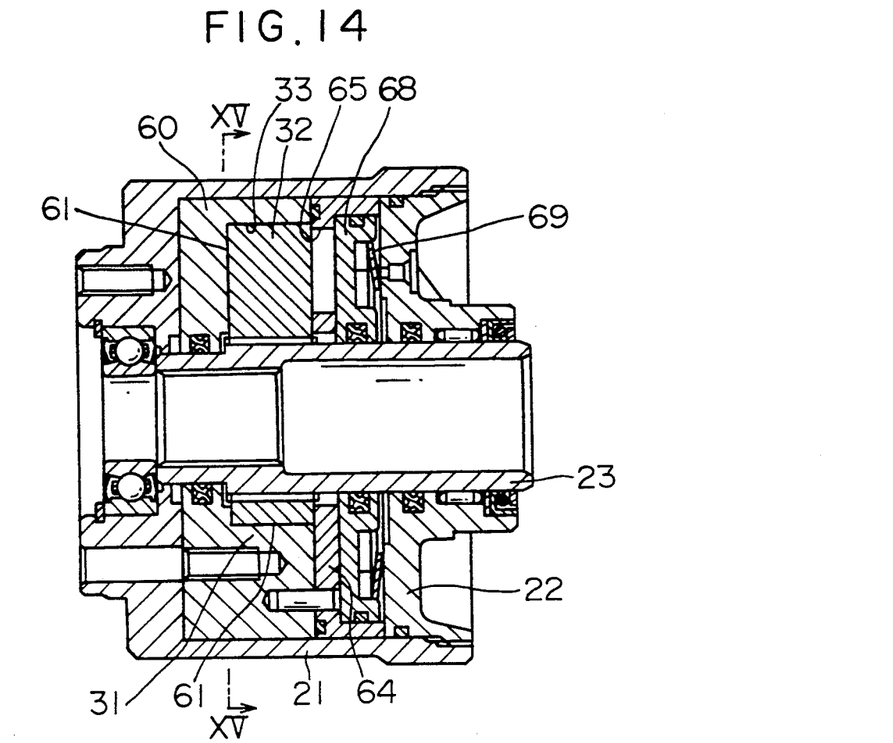
FIG. 14 is a sectional view of a rotary shock absorber according to a sixth embodiment of the present invention.

A sixth embodiment will be described with reference to FIGS. 14 and 15.

In this embodiment, a cylindrical member 60 is received within the housing 21 in a coaxial relation ship therewith and is fixed to the housing 21 by means of bolts. The cylindrical member 60 has the pressure chamber 33 for receiving the rotor 32, and the pair of the partition walls 31 to define the first and second chambers S1 and S2. Further, a cylindrical intermediate member 64 and a piston 68 are disposed between the cylindrical member 60 and the end cap 22. The cylindrical intermediate member 64 is coaxially received by the housing 21 and coupled with the cylindrical member 60, while the piston 68 is received in a piston chamber formed in the intermediate member 64. A spring 69 is disposed between the piston 68 and the end cap 22 to give a thrust force to the piston 68 toward the bottom of the piston chamber. The intermediate member 64 is formed with a pair of communication holes 65 for connecting the second chambers S2 and the piston chamber, in which the piston 68 is received.

A high viscous fluid is filled in the chambers S1 and S2, communication holes 65 and piston chamber. The high viscous fluid in the chambers S1 and S2 flows therebetween through clearances 61 formed between the rotor 32 and the cylindrical member 60.

Figure 15:
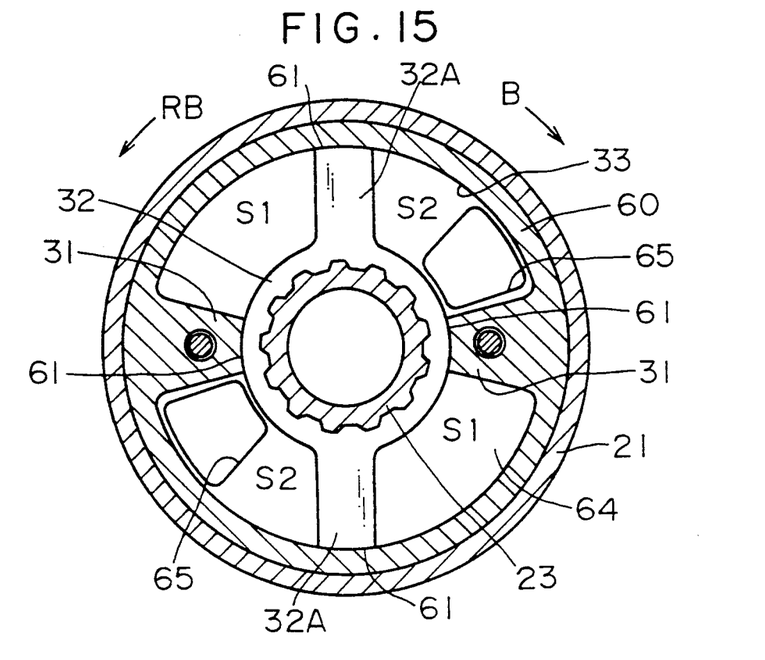
FIG. 15 is a sectional view taken along line XV—XV in FIG. 14.

When the rotor 32 is rotated in the counter clockwise direction (rebound direction) as viewed in FIG. 15, the volumes of the first chambers S1 decreases while the volumes of the second chambers S2 increase, whereby the viscous fluid flows from the first chambers S1 to the second chambers S2 through the clearances 61. During such operation, pressures are generated in the first chambers S1 due to the flow resistances of the clearances 61. Since this pressure increase acts as a damping force, a relatively large damping force is generated in proportion to the rotational speed of the rotary shaft 23, as illustrated by the broken lines C in FIG. 2.

On the contrary, when the rotor 32 is rotated in the clockwise direction (bound direction) as viewed in FIG. 15, the volumes of the second chambers S2 decreases while the volumes of the first chambers S1 increase, whereby the viscous fluid flows from the second chambers S1 to the first chambers S2 through the clearances 61. During such operation, pressures are generated in the second chambers S2 due to the flow resistances of the clearances 61. However, when the pressures are generated in the second chambers S2, the generated pressures are transmitted to the piston chamber, whereby the piston 68 is moved toward the end cap 22 against the thrust force of the spring 69. This retraction of the piston 68 causes an increase of the effective volumes of the second chambers S2, because the second chambers S2 are communicated with the piston chamber through the communication holes 65. Therefore, the pressures generated in the second chambers S2 are relatively low, whereby a relatively small damping force is generated in proportion to the rotational speed of the rotary shaft 23, as illustrated by the broken lines D in FIG. 2.

Obviously, numerous modifications and variations of the present invention are possible in light of the above teachings. It is therefore to be understood that within the scope of the appended claims, the present invention may be practiced otherwise than as specifically described herein.

What is claimed is:

1. A rotary shock absorber comprising:
   a cylindrical housing;
   a rotary shaft carried by said housing for rotation relative thereto;
   a brake disposed between said housing and said rotary shaft to generated a damping force by frictional engagement of said brake;
   a piston received within said housing for axial movement to actuate said brake in response to a pressure applied to said piston, one end of said piston being contacted with said brake;
   a pressure chamber formed in said housing at an axial location adjacent to the other end of said piston and filled with an operation fluid;
   a rotor mechanically coupled with said rotary shaft for rotation therewith and received within said pressure chamber, said rotor having at least one blade extending in a radial direction; and
   at least one partition wall means formed within said pressure chamber so that said pressure chamber is divided into first and second chambers in a circumferential direction by said partition wall means and said blade, wherein said first chamber is formed at one circumferential side of said blade and said second chamber is formed at an other circumferential side of said blade, wherein said rotor and at least one of said housing and said at least one partition wall means form a clearance of a controlled size through which the operation fluid passes when said rotary shaft is rotated relative to said housing to generate a pressure in one of said first and second chambers, wherein said first chamber has a first pressure receiving area through which a pressure generated in said first chamber is transmitted to said piston, wherein said second chamber has a second pressure receiving area through which a pressure generated in said second chamber is transmitted to said piston and wherein said first and second pressure receiving areas are different from one another.

2. A rotary shock absorber as set forth in claim 1, wherein said housing and said rotary shaft are connected to a suspension of a vehicle such that the circumferential location of said blade is such that the angular width of said first chamber is smaller than that of the second chamber when said rotary shaft is located at a neutral angular position of the suspension.

3. A rotary shock absorber as set forth in claim 2, wherein said clearance comprises at least one concave portion in said housing and formed at a predetermined circumferential location corresponding to the neutral position of said blade, said clearance having a predetermined angular width wider than said blade, whereby a throttle is formed through which said operation fluid flows between said first and second chambers, and whereby the flow of said operation fluid through said throttle is stopped when said rotary shaft approaches one of its stroke ends.

4. A rotary shock absorber as set forth in claim 1, wherein the circumferential location of said blade is determined so that the angular width of said first chamber is the same as that of the second chamber when said rotary shaft is located a neutral angular position thereof, and wherein an intermediate member is disposed between said piston and said pressure chamber, and said intermediate member being formed with first and second connection holes which apply to the other end of said piston pressures generated in said first and second chambers, respectively, an opening of said first connection hole facing said piston being larger than that of an opening of said second connection hole facing said piston.

* * * * *